US012472387B2

(12) United States Patent
Morton et al.

(10) Patent No.: US 12,472,387 B2
(45) Date of Patent: Nov. 18, 2025

(54) ACCELERATING CUTANEOUS HEALING UTILIZING NON-INVASIVE FOCUSED ULTRASOUND

(71) Applicant: General Electric Company, Schenectady, NY (US)

(72) Inventors: Christine A. Morton, Mechanicville, NY (US); Christopher Michael Puleo, Niskayuna, NY (US); Jeffrey Michael Ashe, Gloversville, NY (US); Victoria Eugenia Cotero, Troy, NY (US)

(73) Assignee: GE PRECISION HEALTHCARE LLC, Waukesha, WI (US)

(*) Notice: Subject to any disclaimer, the term of this patent is extended or adjusted under 35 U.S.C. 154(b) by 77 days.

(21) Appl. No.: 18/481,700

(22) Filed: Oct. 5, 2023

(65) Prior Publication Data

US 2024/0115886 A1 Apr. 11, 2024

Related U.S. Application Data

(60) Provisional application No. 63/413,365, filed on Oct. 5, 2022.

(51) Int. Cl.
*A61N 7/02* (2006.01)
*A61N 7/00* (2006.01)

(52) U.S. Cl.
CPC ........ *A61N 7/02* (2013.01); *A61N 2007/0017* (2013.01); *A61N 2007/0026* (2013.01); *A61N 2007/0047* (2013.01)

(58) Field of Classification Search
CPC .............. A61N 7/02; A61N 2007/0017; A61N 2007/0026; A61N 2007/0047; A61N 7/022; A61N 2007/0034; A61B 2017/00154
See application file for complete search history.

(56) References Cited

U.S. PATENT DOCUMENTS 9,585,977 B2 3/2017 Zumeris et al.
10,898,735 B2 1/2021 Slayton
(Continued)

FOREIGN PATENT DOCUMENTS

CN 112675443 A * 4/2021
WO 2008065652 A2 6/2008
(Continued)

OTHER PUBLICATIONS

CN-112675443 machine translation (Year: 2021).*
(Continued)

*Primary Examiner* — Alexei Bykhovski
(74) *Attorney, Agent, or Firm* — Fletcher Yoder, P.C.

(57) ABSTRACT

The present approaches are generally directed to facilitating healing of wounds, including chronic wounds typically associated with slow heal times or which are persistent. In one embodiment, a method of promoting wound healing comprises positioning an ultrasound transducer at a stimulation site on a subject having a wound. Pulsed focused ultrasound (pFUS) is non-invasively applies using the transducer to cause modulation of a target anatomic site containing resident or circulating immune cells. Modulation of the target anatomic site of the subject causes migration of one or more of monocytes, macrophages, or neutrophils to a wound bed of the wound.

20 Claims, 8 Drawing Sheets

(56) References Cited

U.S. PATENT DOCUMENTS

| | | | | |
|---|---|---|---|---|
| 2007/0232962 A1* | 10/2007 | Zumeris | ................. | A61L 2/025 |
| | | | | 601/2 |
| 2010/0069797 A1 | 3/2010 | Cain et al. | | |
| 2013/0012755 A1* | 1/2013 | Slayton | ................... | A61N 7/00 |
| | | | | 601/3 |
| 2020/0054228 A1* | 2/2020 | Puleo | .................. | A61B 5/6825 |
| 2021/0338805 A1* | 11/2021 | Puleo | .................... | C12N 15/86 |

FOREIGN PATENT DOCUMENTS

| | | | | |
|---|---|---|---|---|
| WO | 2020210458 A1 | 10/2020 | | |
| WO | WO-2021188200 A2 * | 9/2021 | ............ | A61B 5/416 |

OTHER PUBLICATIONS

International Search Report and the Written Opinion for PCT/US2023/034579 mailed Jan. 17, 2024, 17 pages.
International Application No. PCT/US2023/034579 filed Oct. 5, 2023—International Search Report and Written Opinion issued on Jan. 17, 2024; 17 pages.

* cited by examiner

ACCELERATING CUTANEOUS HEALING UTILIZING NON-INVASIVE FOCUSED ULTRASOUND

CROSS-REFERENCE TO RELATED APPLICATIONS

This application claims the benefit of U.S. Provisional Application No. 63/413,365, entitled "ACCELERATING CUTANEOUS HEALING A RODENT MODEL OF TYPE II DIABETES UTILIZING NON-INVASIVE FOCUSED ULTRASOUND OF THE SPLEEN", filed Oct. 5, 2022, which is herein incorporated by reference in its entirety.

TECHNICAL FIELD

The present disclosure is related to the use of applied energy, such as pulsed focused ultrasound (pFUS) to facilitate wound healing, such as cutaneous healing. More specifically, the present disclosure discloses approaches in which pulsed focused ultrasound is applied to target tissue, such as the spleen, to facilitate and accelerate the healing of wounds, such as chronic wounds, that are otherwise resistant to healing or slow to heal.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The cost of care of non-healing wounds is projected to be in the billions, with the number of individuals in the US affected being above 6.5 million and increasing as the population ages. There is also significant mortality associated with non-healing wounds with 5-year mortality rates being higher than many common cancers such as prostate and breast cancer. The 5-year mortality rate approaches 50% when amputation is necessary due to necrosis following tissue death. This has been attributed to a wound infection rate of around 50%. Once a first amputation is necessary, multiple amputations are often required and the 5-year mortality rate rises to over 70%. Chronic wounds, defined as wounds that do not heal within 3 months, tend to have different microflora than healing wounds and are more susceptible to infection, although infection is not a prerequisite to impaired healing. Chronic wounds generally fall into the three categories of diabetic foot ulcers (DFU), pressure ulcers (bed sores), and leg ulcers caused by peripheral arterial disease (PAD) or post thrombotic syndrome (PTS). Chronic inflammation, a frequent comorbidity of Type 2 diabetes mellitus (T2DM), can negatively influence healing by increasing the systemic levels of pro-inflammatory cytokines. Diabetic foot ulcers represent the most common complication in patients with poor disease control (e.g., accelerated metabolic syndrome, chronic inflammation) affecting more than 25% of those with Type 2 diabetes mellitus. Lack of mobility and/or flexibility are often cited by patients with diabetic foot ulcers as reasons for low compliance with foot self-care protocols. Many patients with diabetes report incidences of slow healing or chronic wounds, including DFU, which results in an annual burden on the healthcare system exceeding 20 billion dollars.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approaches are generally directed to facilitating healing of wounds, including chronic wounds typically associated with slow heal times or which are persistent. By way of example, healing is delayed in Type 2 diabetes mellitus, and new treatment approaches may prove helpful. As discussed herein, daily splenic exposure to pulsed focused ultrasound (pFUS) during wound healing may accelerate closure rate via altered systemic cytokine titers. By way of example, in general energy, such as ultrasound energy, may be applied to one or more internal organs, structures, or features that modulate or otherwise affect the cholinergic anti-inflammatory pathway. In particular, splenic pulsed focused ultrasound alters inflammatory cytokines in models of acute endotoxemia and pneumonia via modulation of the cholinergic anti-inflammatory pathway (CAP). Non-invasive ultrasound may be applied that is directed to the spleen of a rodent model (Zucker Diabetic Sprague Dawley (ZDSD) rats) of Type 2 Diabetes Mellitus (T2DM) with full thickness cutaneous excisional wounds in an attempt to accelerate wound healing via regulation of aberrant cytokine expression. In approaches discussed herein daily (1×/day, Monday-Friday) pulsed focused ultrasound pulses were applied externally to the spleen area for 3 minutes (e.g., a treatment duration) over 18 course of 15 days (e.g., a treatment interval). Wound diameter was measured daily, and relative levels of cytokines were evaluated in spleen and wound bed lysates. Non-invasive splenic pulsed focused ultrasound accelerated wound closure by up to 4.5 days versus sham controls. The time to heal in all treated groups was comparable to that of healthy rats from previously published studies (ref below), suggesting that the pulsed focused ultrasound treatment restored a normal wound healing phenotype to the ZDSD rats. IL-6 (pro-inflammatory at high levels, may be anti-inflammatory at low levels) was lower in stimulated spleen (−2.24±0.81 Log 2FC p=0.02) while L-selectin (adhesion molecule, important for cell migration and epithelialization) was higher in the wound bed of stimulated rodents (2.53±0.72 Log 2FC p=0.003). In summary, splenic pulsed focused ultrasound accelerates healing in a rodent model, and has the potential to provide a novel, systemic, non-invasive approach for wound care.

In one embodiment, a method of promoting wound healing is provided. In accordance with this embodiment an ultrasound transducer is positioned at a stimulation site on a subject having a wound. Pulsed focused ultrasound (pFUS) is non-invasively applied, using the transducer, to a target organ of the subject so as to cause modulation of the cholinergic anti-inflammatory pathway of the subject. Modulation of the cholinergic anti-inflammatory pathway of the subject causes migration of one or more of monocytes, macrophages, or neutrophils to a wound bed of the wound.

In accordance with aspects of such an embodiment, the stimulation site is distal from the wound.

In accordance with aspects of such an embodiment, the target organ is a spleen of the subject and the non-invasively applied pulsed focused ultrasound stimulates nerve pathways within the spleen.

In accordance with aspects of such an embodiment, the wound is an acute or chronic cutaneous wound.

In accordance with aspects of such an embodiment, modulation of the cholinergic anti-inflammatory pathway of the subject alters concentrations of systemic circulating pro-inflammatory molecules. In accordance with further aspects of such an embodiment, the pro-inflammatory molecules comprise TNFα and IL-6.

In accordance with aspects of such an embodiment, modulation of the cholinergic anti-inflammatory pathway regulates aberrant cytokine expression in the subject.

In accordance with aspects of such an embodiment, applying pulsed focused ultrasound to the target organ of the subject comprises applying pulsed focused ultrasound to the spleen of the subject at least once a day over a treatment interval.

In accordance with aspects of such an embodiment, the pulsed focused ultrasound (pFUS) applied to the target organ has parameters of a pulse center frequency of 1.1 MHz, a pulse repetition period of 0.5 msec, a pulse amplitude of 300 $mV_{pp}$, a 150 cycle burst, and a burst period of 200 msec.

In accordance with aspects of such an embodiment, applying pulsed focused ultrasound (pFUS) to the spleen of the subject accelerates wound closure between 3 to 5 days relative to no treatment.

In accordance with aspects of such an embodiment, the target organ is the spleen and IL-6 levels are reduced in the spleen in response to applying the pulsed focused ultrasound (pFUS) to the spleen.

In accordance with aspects of such an embodiment, L-selectin levels are higher in the wound bed of the wound in response to applying the pulsed focused ultrasound (pFUS) to the target organ.

In accordance with aspects of such an embodiment, a first pulsed focused ultrasound (pFUS) is applied to the target organ of the subject within 24 hours of the wound forming.

In an additional embodiment, a system for promoting wound healing is provided. In accordance with this embodiment, the system comprises: a function generator configured to produce a pulsed sinusoidal waveform, an RF power amplifier configured to amplify the pulsed sinusoidal waveform, a matching network configured to receive the amplified pulsed sinusoidal waveform, and a transducer connected to the matching network and configured to generate focused ultrasound pulses based upon the amplified pulsed sinusoidal waveform. In accordance with this embodiment, the system is configured to, upon placement of the transducer at an external stimulation site of a subject, direct focused ultrasound pulses toward a target organ so as to cause modulation of the cholinergic anti-inflammatory pathway of the subject. Modulation of the cholinergic anti-inflammatory pathway of the subject causes migration of one or more of monocytes, macrophages, or neutrophils to a wound bed of the wound.

In accordance with aspects of such an additional embodiment, the transducer comprises a high intensity focused ultrasound (HIFU) transducer.

In accordance with aspects of such an additional embodiment, the focused ultrasound pulses have a pulse center frequency of 1.1 MHz, a pulse repetition period of 0.5 msec and a pulse amplitude of 300 $mV_{pp}$.

In accordance with aspects of such an additional embodiment, the target organ is a spleen of the subject and the non-invasively applied pulsed focused ultrasound stimulates nerve pathways within the spleen.

In accordance with aspects of such an additional embodiment, modulation of the cholinergic anti-inflammatory pathway of the subject alters concentrations of systemic circulating pro-inflammatory molecules.

In accordance with aspects of such an additional embodiment, modulation of the cholinergic anti-inflammatory pathway regulates aberrant cytokine expression in the subject.

In a further embodiment, a method of promoting wound healing is provided. In accordance with this embodiment, a high intensity focused ultrasound (HIFU) transducer is positioned at a stimulation site on a subject having a chronic cutaneous wound that is distal from the stimulation site. Pulsed focused ultrasound (pFUS) is non-invasively applied, using the transducer, to a spleen of the subject at least once a day over a treatment interval so as to stimulates nerve pathways within the spleen and cause modulation of the cholinergic anti-inflammatory pathway of the subject. The pulsed focused ultrasound applied to the spleen has a pulse center frequency of 1.1 MHz, a pulse repetition period of 0.5 msec and a pulse amplitude of 300 $mV_{pp}$. Modulation of the cholinergic anti-inflammatory pathway regulates aberrant cytokine expression in the subject and alters concentrations of systemic circulating pro-inflammatory molecules.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Normal wound healing consists of four phases (hemostasis, inflammation, proliferation, and remodeling) and is similar for acute and chronic wounds, albeit with different timing. Failure at any one of these stages can lead to non-healing wound. Hemostasis, consisting of a rapid migration of platelets, neutrophils, and fibrin deposition, causes the wound site to close by clotting. The inflammatory phase (early and late) starts with infiltration of the wound site by neutrophils (within 24-36 hours), whose main function is to prevent infection by phagocytosing bacteria/pathogens, foreign particles, damaged cells, and tissue. As part of the late inflammatory phase (48-72 h after injury) the macrophage population becomes dominant after chemoattraction of monocytes via clotting factors, cytokines and chemokines. Macrophages also provide tissue growth factors such as Transforming Growth Factor (TGF)-$\beta$, TGF-$\alpha$, epidermal growth factor (EGF), fibroblast growth factor (FGF) and collagenase which are required for activation of the cells involved in wound repair (including keratinocytes, fibroblasts, and vascular endothelial cells). Lymphocytes (T-cells) enter the wound site in the late inflammatory phase (72 h after injury) mediated by interleukin-1 (IL-1), complement system components such as C3 and C5, and immunoglobulin G (IgG) breakdown products. Classical macrophages (M1) secrete proinflammatory cytokines which help recruit lymphocytes to the wound bed. Non-classical macrophages (M2) secrete anti-inflammatory cytokines which trigger the transition into the proliferation phase phenotype, a transition which was observed to be accelerated by the pulsed ultrasound treatment as discussed herein. The proliferative phase starts on the third day after wounding and lasts for about 2 weeks. It is characterized by migration of fibroblasts, keratinocytes, epithelial cells and vascular cells, collagen synthesis, adhesion, traction, and epithelization.

Finally, the remodeling/maturation phase is responsible for development of new epithelium and scar tissue formation and can last 1-2 years. This phase also draws the wound together, much like the contraction of muscle cells, and forms a repaired ECM. Collagen is remodeled and the wound fully closes. The skin is generally at about 80% integrity until this phase is finished and is significantly weaker and prone to reinjury during this time. Once a scar is formed, the skin never regains the full integrity of uninjured skin and also lacks elasticity leading to hindered movement. Any one of these stages can fail, although healing tends to become arrested in the inflammatory stage, never progressing to epithelialization and reconstruction. As discussed herein, techniques involving starting pulsed focused ultrasound (pFUS) treatment 24 hours after wound creation were explored to attenuate early inflammation through CAP modulation, which in turn alters the healing timeline.

Advancement in chronic wound treatment (including diabetic foot ulcers) has been lacking for decades. The development of new technology and advancement in the treatment of wounds in general, such as chronic diabetic foot ulcers wounds, is needed. Prior techniques include negative pressure wound therapy (NPWT) and current conventional treatment consists of wound management using techniques such as using moist wound healing, debridement, growth factor-soaked dressings, and walker casts to off-load the injured regions. All of these mitigations are aimed at nursing the wound but not treating a root cause such as chronic inflammation. NPWT, which is more efficacious for acute wounds, is still utilized for chronic wounds with limited success. Although targeted drug therapies are largely nonexistent, antibiotic administration, both topically and systematically, is the most widely used.

Bioelectronic medicine is a rapidly evolving field. In practice, electrical stimulation may be applied to nerve fibers to elicit a response and in many cases an electrode is surgically implanted to deliver energy to the vagus nerve which then has a downstream effect. Vagus nerve stimulation can modulate inflammation via cholinergic anti-inflammatory pathway (CAP) signaling. CAP is a neural pathway that inhibits TNF$\alpha$ production (as well as other pro-inflammatory cytokines) in the spleen, liver and heart when activated. This pathway requires both the vagus nerve and 7$\alpha$ receptors and if either are disrupted the anti-inflammatory response is reversed. Techniques are described herein that provide for less invasive intervention and which can be applied in a point of care setting (i.e., non-surgical). In particular, as discussed herein methods are described to activate the CAP non-invasively using focused ultrasound applied directly to a target organ (e.g., spleen). Although examples discussed herein generally relate to applying ultrasound pulses to a spleen, it should be understood that the target organ may be any organ capable of modulating inflammation via cholinergic anti-inflammatory pathway (CAP) signaling in response to non-invasive application of pulsed ultrasound energy. In the presently described examples, a single ultrasound treatment was found to decrease systemic Tumor Necrosis Factor alpha (TNF$\alpha$) in an in vivo LPS induced model of endotoxemia within 1 hour. Additionally, peripheral blood, collected post pulsed focused ultrasound stimulation and exposed to LPS ex vivo, produced similar results. Systemic effects were also observed at sites distal from the stimulated site, such as attenuation of inflammation caused by a challenge with *Streptococcus* Pneumonia.

Figure 1:
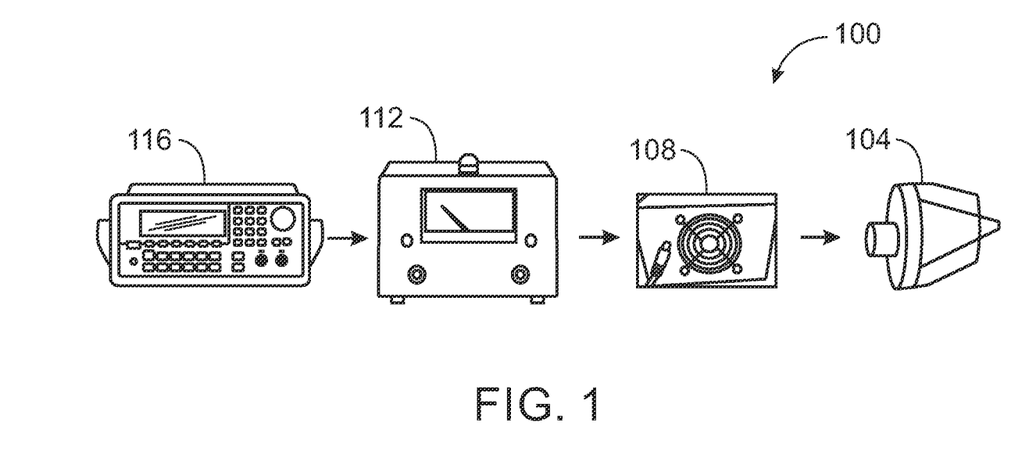
FIG. 1 depicts a focused ultrasound system suitable for non-invasively applying focused ultrasound pulses to a target organ to facilitate a wound healing process, in accordance with aspects of the present disclosure.
Figure 2:
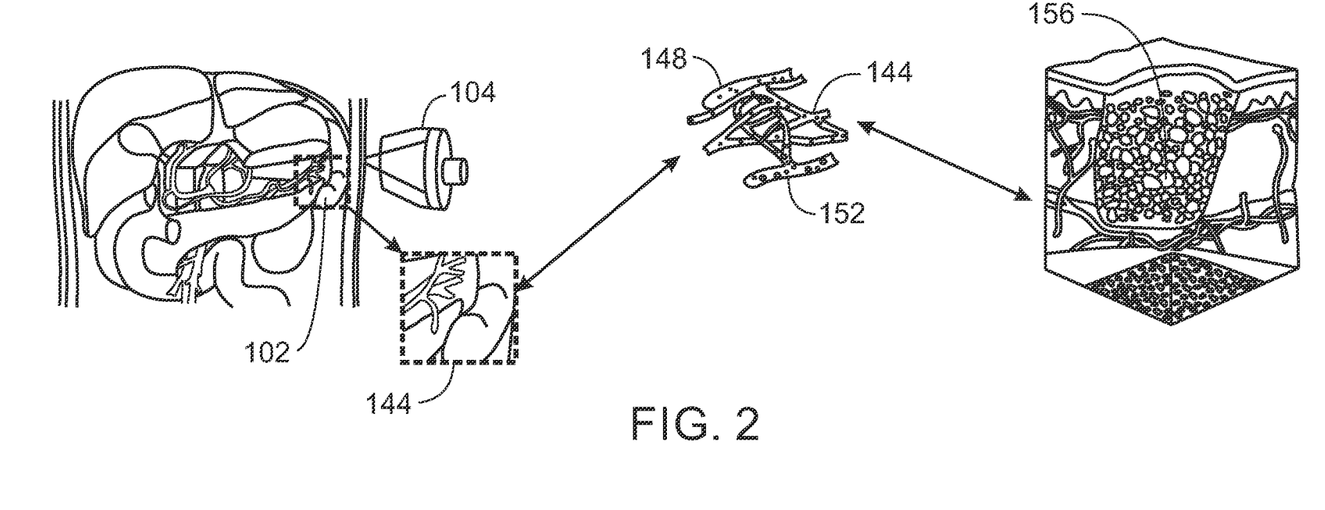
FIG. 2 depicts a stimulation site of focused ultrasound pulses and the relationship between a target organ, here depicted as a spleen, and skin through both blood and lymph circulation, in accordance with aspects of the present disclosure.

As discussed herein, cutaneous wound healing was accelerated by using a pulsed focused ultrasound system, as illustrated in FIG. 1, to stimulate nerve pathways within the spleen. Turning to FIG. 2, the stimulation site and the relationship between the spleen and skin through both blood and lymph circulation are depicted. Based on the results disclosed herein, it was observed that splenic pulsed focused ultrasound altered monocytes/macrophages/neutrophils migrated to the wound bed, in turn modifying the wound so that it was more amendable to healing through systemic immune response mediation, and altered concentrations of systemic circulating pro-inflammatory molecules (such as TNFα, IL-6).

ZDSD rats were tested as a model of delayed healing. Stimulation was performed on the spleen of ZDSD rats with full thickness excisional skin wounds up to once a day for 15 days. The test groups included animals from three age classifications that correspond to different disease progressions of Type 2 diabetes mellitus from prediabetes to advanced diabetes with comorbidities. To further model chronic inflammation, a comorbidity of Type 2 diabetes mellitus, the oldest group received an ultralow dose of LPS (5 ng/kg) 3 times a week starting 14 days prior to wound creation. A pulsed focused ultrasound-induced acceleration in wound closure was observed for all age groups compared to sham controls. As discussed herein, in this manner ultrasound was used to stimulate splenic CAP and modulate the immune system distal from the wound site to accelerate healing.

With the preceding in mind, FIG. 1 illustrates aspects of a focused ultrasound system 100 used to perform the techniques discussed herein. In one embodiment the system 100 comprises a 1.1 MHz, High Intensity Focused Ultrasound (HIFU) transducer 104 and matching network 108, an RF power amplifier 112, and a function generator 116. In this example the function generator 116 produces a pulsed sinusoidal waveform. This pulsed sinusoidal waveform is amplified by the RF power amplifier 112 and sent to the impedance-matching network 108 connected to the transducer 104. In certain embodiments the pulse center frequency was 1.1 MHz, the pulse repetition period was 0.5 msec (corresponding to a pulse repetition frequency of 2000 Hz); and the pulse amplitude was 300 $mV_{pp}$. In one embodiment, control circuitry, such as one or more processors configured to process executable code or one or more application specific integrated circuits (ASICs) may be provided as part of (or in communication with) one or more of the function generator 116, RF power amplifier 112, matching network 108, and/or HIFU transducer 104 so as to allow directed energy application to a target organ as described herein, such as at the intervals, energies, and/or durations described herein to stimulate wound healing.

In one implementation the transducer 104 is a 70-mm diameter HIFU transducer having a spherical face with a 65-mm radius of curvature. In one such embodiment the transducer depth of focus is between 50 mm and 80 mm, such as 65 mm. In one embodiment the numerically simulated pressure profile has a full width at half amplitude of 1.8 mm laterally and 12 mm in the depth direction. The HIFU transducer 104 may be acoustically coupled to the subject through a standoff, such as a 6-cm-tall plastic cone filled with degassed water, and acoustical coupling gel.

Turning to FIG. 2 an abdomen showing the location of the spleen 140 and delivery location of pulsed focused ultrasound via transducer 104 is depicted. When non-invasive ultrasound energy is applied to the spleen 102 cytokine production is modified. as discussed herein. Splenic lymph nodes 144, and splenic arteries 148 and veins 152 are shown in the expansion. Splenic lymph nodes 144 connect to the lymphatic vasculature, which connects the entire lymphatic system, including lymphatics in the skin. Skin resident macrophage release chemoattractant to recruit systemic immune cells through extravasation. When skin is wounded (depicted as wounded skin 156 distal to the stimulation site), vessels surrounding the area deliver platelets to achieve homeostasis followed by neutrophils within 1 hour to initiate inflammation and start the healing process. Monocytes arrive next and differentiate into M1 macrophage. Efferent lymph vessels help to drain the area of protein rich inflammatory fluid from the interstitium while afferent vessels help supply the area with cytokines and lymphatic leukocytes to aid in healing.

With respect to the animal studies discussed herein, thirty 16-25 week old ZDSD rats were randomized into the following groups: Group 1 (N=10): 16 week old, Group 2 (N=10): 22 week old, and Group 3 (N=10): 25 week old with induced chronic inflammation (5 ng/kg LPS; 3×week). Each group was further segregated into pulsed focused ultrasound stimulated (5 rodents with 2 wounds each) or sham control (5 rodents with 2 wounds each). One animal was removed from the Group 2 sham cohort during the study due to a complication of hypertension. Animals were obtained from Charles River Laboratories, and were housed in 12:12 light-dark cycle. They were allowed ad libitum access to both food and water and were fed LabDiet 5008.

Two full thickness skin excision wounds were created to the head of each rat while under anesthesia with 3% isoflurane. After shaving the head and cleaning the area with betadine and 70% ethanol, an 8-mm biopsy punch instrument was used to create the wounds, and the skin was carefully removed. Analgesics were withheld due to the effects that each drug class has on immune response; there were no physical signs of distress or discomfort through the course of the study. The wounds were left uncovered following surgery, and the animals were housed singly to avoid complications from the activity of cage mates. Animals in Group 3 received 5 ng/kg LPS 3×/week I.P. starting 14 days prior to wounding and continuing throughout the study to induce chronic inflammation. Starting on day 1 post-surgery, pulsed focused ultrasound energy was applied to the spleen after coupling a HIFU transducer 104 to shaved skin with coupling gel and while using isoflurane for restraint. Wounds were photographed and measured from anterior to posterior using digital calipers and the diameter was recorded. To the groups receiving U/S stimulation, energy was applied for 3 one-minute sessions with a rest of 30 seconds between each session. The following ultrasound parameters were used: 1.1 MHz, 300 $mV_{pp}$, 150 cycle burst, burst period of 200 msec. In the case of sham controls, the transducer was placed over the spleen, but no energy was applied. Stimulations occurred on post-surgery days 1-4, 7-11, 14-15. Animals were euthanized on day 16 regardless of wound progression.

Blood was drawn once a week and analyzed for both complete blood counts and blood chemistry. Blood chemistry measurements, including glucose, were taken by 9:00 AM. Remaining plasma was frozen for biochemical analysis. Upon completion of each study, animals were euthanized by $CO_2$ asphyxiation. Terminal blood draws were completed via cardiac puncture and the spleens and wound beds were resected, snap frozen and stored at −80° C. until cytokines were extracted and analyzed.

Figure 3:
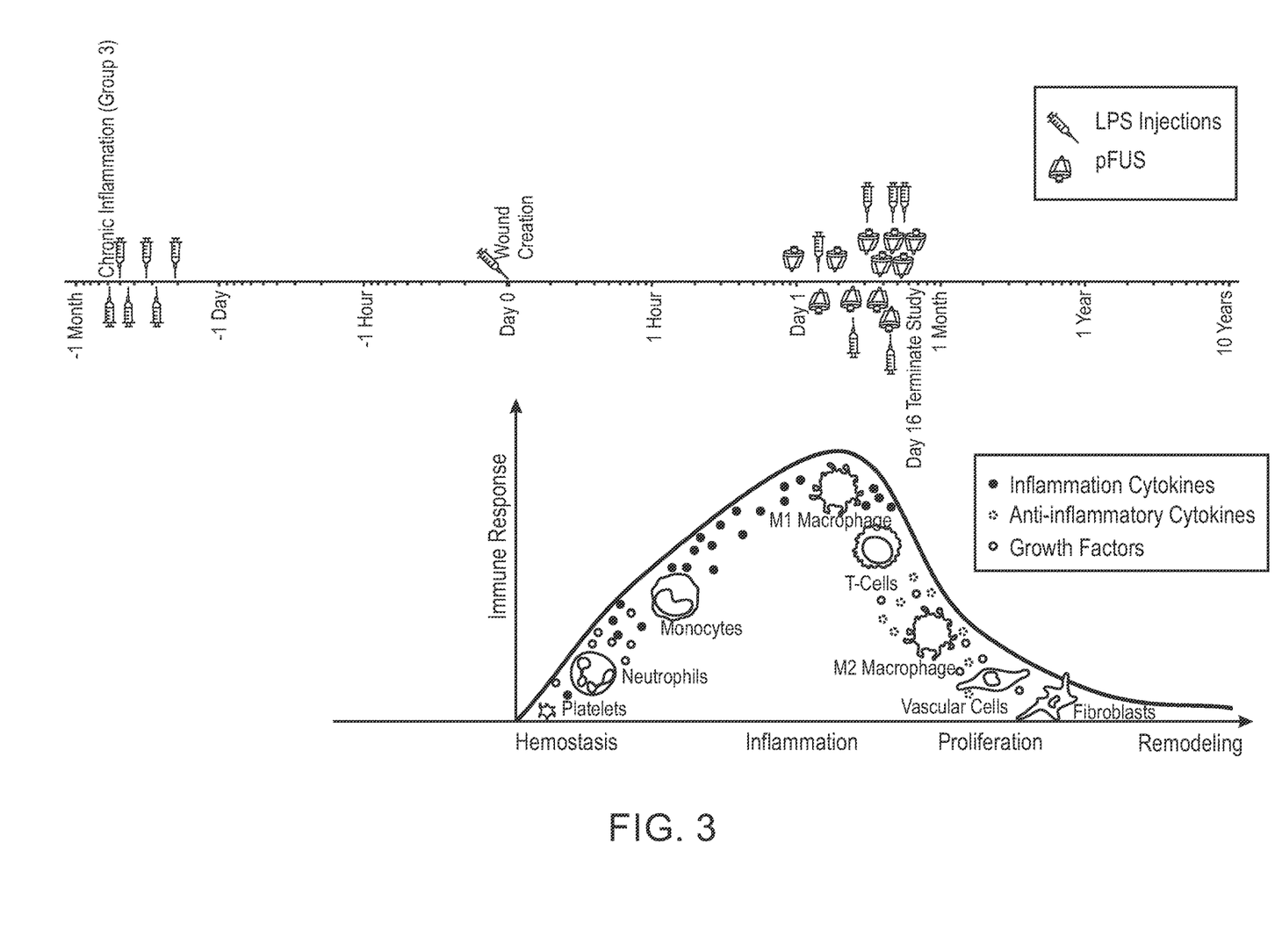
FIG. 3 visually depicts a study timeline (top) on a logarithmic scale in conjunction with expected stages of wound healing (bottom) after pulsed focused ultrasound intervention and with the associated immune response time matched to the study timeline, in accordance with aspects of the present disclosure.

With the preceding in mind, FIG. 3 visually illustrates aspects of this study timeline in relation to the wound healing timeline. In this illustrations, FIG. 3 visually represents a study timeline (top) including LPS injections for Group 3 and pulsed focused ultrasound stimulation for all groups on a logarithmic scale. In addition, FIG. 3 visually represents the expected stages of wound healing (bottom) after pulsed focused ultrasound intervention and with the associated immune response time matched to the study timeline illustrated above. As evident in the wound healing profile, phenotypic changes are present in response to the pulsed ultrasound treatment, such as the accelerated transition from an M1 macrophage presence to an M2 macrophage presence in the wound profile.

With respect to protein extraction for biochemical analysis, frozen tissue was minced and added to ice-cold PBS supplemented with protease inhibitors. Samples were homogenized using an IKA T18 Ultra-Turrax set to 24,000 RPM until the tissue was dispersed. Samples were held on ice until all samples were processed and then tissue homogenates were cleared by centrifugation at 4° C. A NanoDrop instrument was used to assess the OD280 of each sample prior to each assay as outlined in the assay protocol.

With respect to cytokine screening, panels of 34 cytokines, chemokines, and growth factors (gene symbols: AGER, AGRN, CCL2, CCL20, CD86, CNTF, CSF2, CX3CL1, CXCL1, CXCL2, CXCL3, CXCL5, FASLG, ICAM1, IFNG, IL10, IL13, IL1A, IL1B, IL1RL2, IL2, IL4, IL6, INHBA, LEP, MMP8, NGF, PDGFA, PPBP, PRLR, SELL, TIMP1. TNF, VEGFA) were assessed using a sandwich-based antibody array (C2 antibody array). One hundred OD units of spleen or wound bed protein lysates were incubated with the membrane arrays and processed according to the manufacturer's instructions with the exception that streptavidin-cy5 secondary antibody was used instead of streptavidin-HRP to utilize fluorescent scanning. Membranes were imaged using a Typhoon scanner and median fluorescence intensity values were extracted using ImageJ software using a microarray profile. All sample blocks were normalized to a reference block using positive control spots and background was subtracted using blank spots.

In terms of statistical analysis, results as described herein are expressed as means ±SEM. Multiple unpaired Student's t-test (healing rate and cytokine data) or repeated measure two-way ANOVA followed by Tukey's multiple comparisons test (body weight, glucose levels, and wound size over time) were used to assess the differences between groups. Data were considered significant at $P \leq 0.05$. Linear regression analysis of normalized wound diameter (% mm of initial diameter) was used to extrapolate the time at which wounds would be completely closed. The x-intercept (days) when y=0 (wound size) was defined to be the predicted time of closure. Cytokine arrays were compared by calculating the log2 fold change (Log2FC) of median fluorescence intensity for each pair of samples (pFUS vs. Sham). A heat map was generated and hierarchal cluster analysis was performed to demonstrate differences in groups. Pearson correlation was used to determine significant correlation between wound size and relative cytokine expression.

Figure 4:
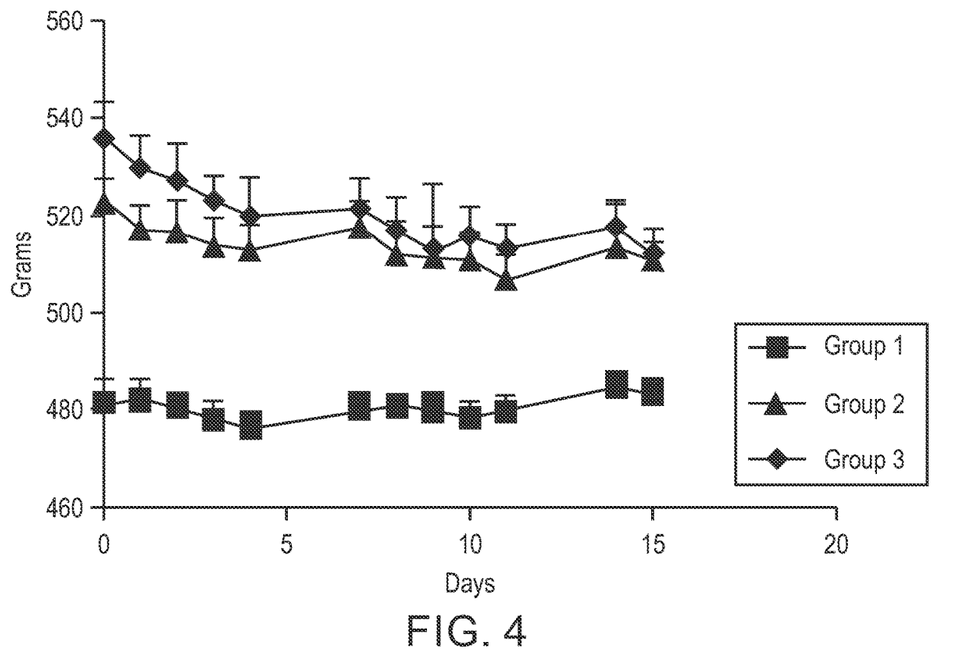
FIG. 4 graphically depicts change, or lack of change, in body weight between study groups, in accordance with aspects of the present disclosure.

With the preceding methodology and analysis discussion in mind, results were obtained as described below. Physiological characteristics were assessed to track the overall health of the animals throughout the study. Animals were weighed each weekday day (i.e., Monday-Friday). Glucose was measured on day −14 (Group 3, when LPS administration started), day 0 (all groups) and day 16 (all groups). In terms of physiological characteristics results, while body weights were not different between animals within the groups that received either pulsed focused ultrasound or sham controls, they were different among the age groups, as shown graphically in FIG. 4. In particular, as shown in FIG. 4, Group 1 exhibited (16-week ZDSD prediabetic rats) no significant changes in body weight at 15 weeks. Similarly, Group 2 (22-week ZDSD diabetic rats) did not have significant weight change. Group 3 (25 week+10 ng/kg LPS) lost 4.6% body weight which was significant from day 0 (*p<0.05) and likely due to the response to LPS. In particular, with respect to Group 3, both pulsed focused ultrasound and sham controls, exhibited significant weight loss, 5.7% (P<0.05), during the study. This was to be expected due to low-grade chronic inflammation that LPS injections induced.

Figure 5:
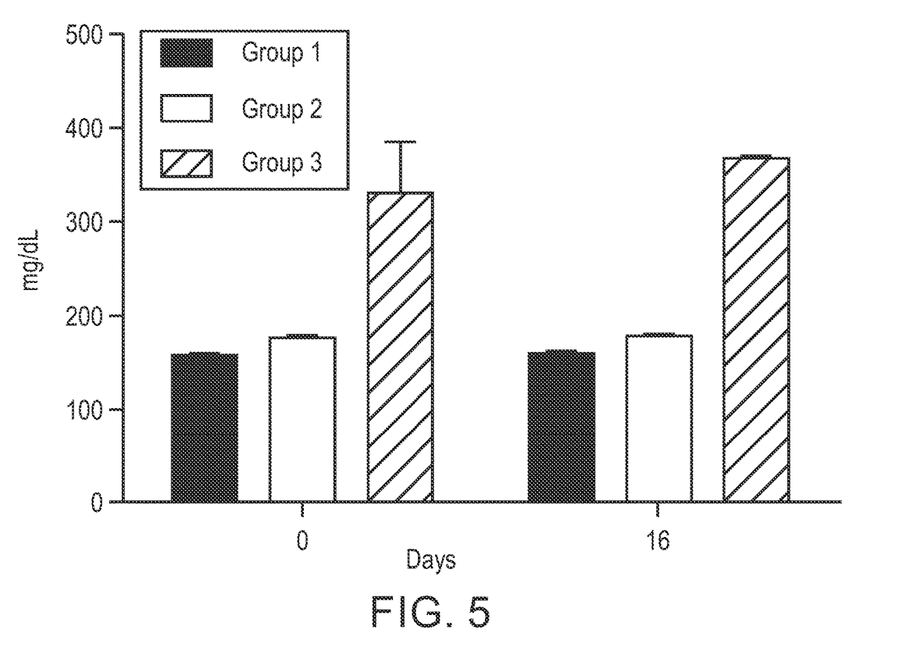
FIG. 5 graphically depicts glucose levels between study groups, in accordance with aspects of the present disclosure.

Random glucose levels were assessed on day 0 (prior to surgery) and day 16. Glucose levels were different for each group depending on age but remained unchanged between day 0 and day 16, as shown graphically in FIG. 5. In particular, no significant changes were found in blood glucose levels in Group 1, 2 or 3 over the course of the study.

Although complete blood counts (CBC) for each group were within normal range, significant differences in white blood cells (WBC) were observed in groups 1 and 2 both over time and between pulsed focused ultrasound and sham treated animals. Both monocytes and lymphocytes were lower in Group 1 at day 7, and neutrophils and monocytes were decreased by day 16 in Group 2. Significant differences were not observed in neutrophil, lymphocyte, or monocyte populations. Blood chemistry for each group were within the normal range in all measured parameters throughout the study with the exception of glucose as mentioned above.

Figure 6:
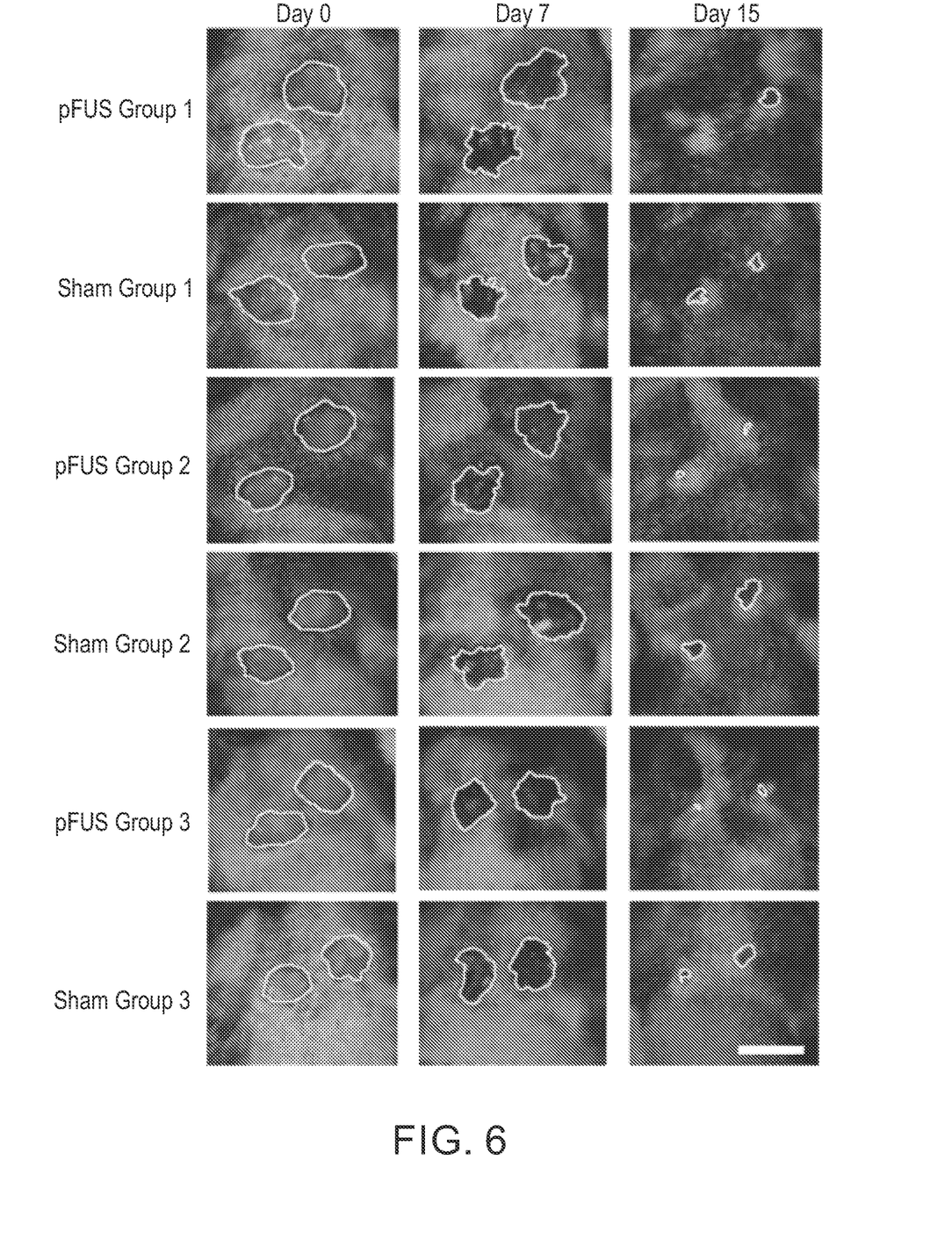
FIG. 6 depicts excision wounds by day and study group, in accordance with aspects of the present disclosure.
Figure 7:
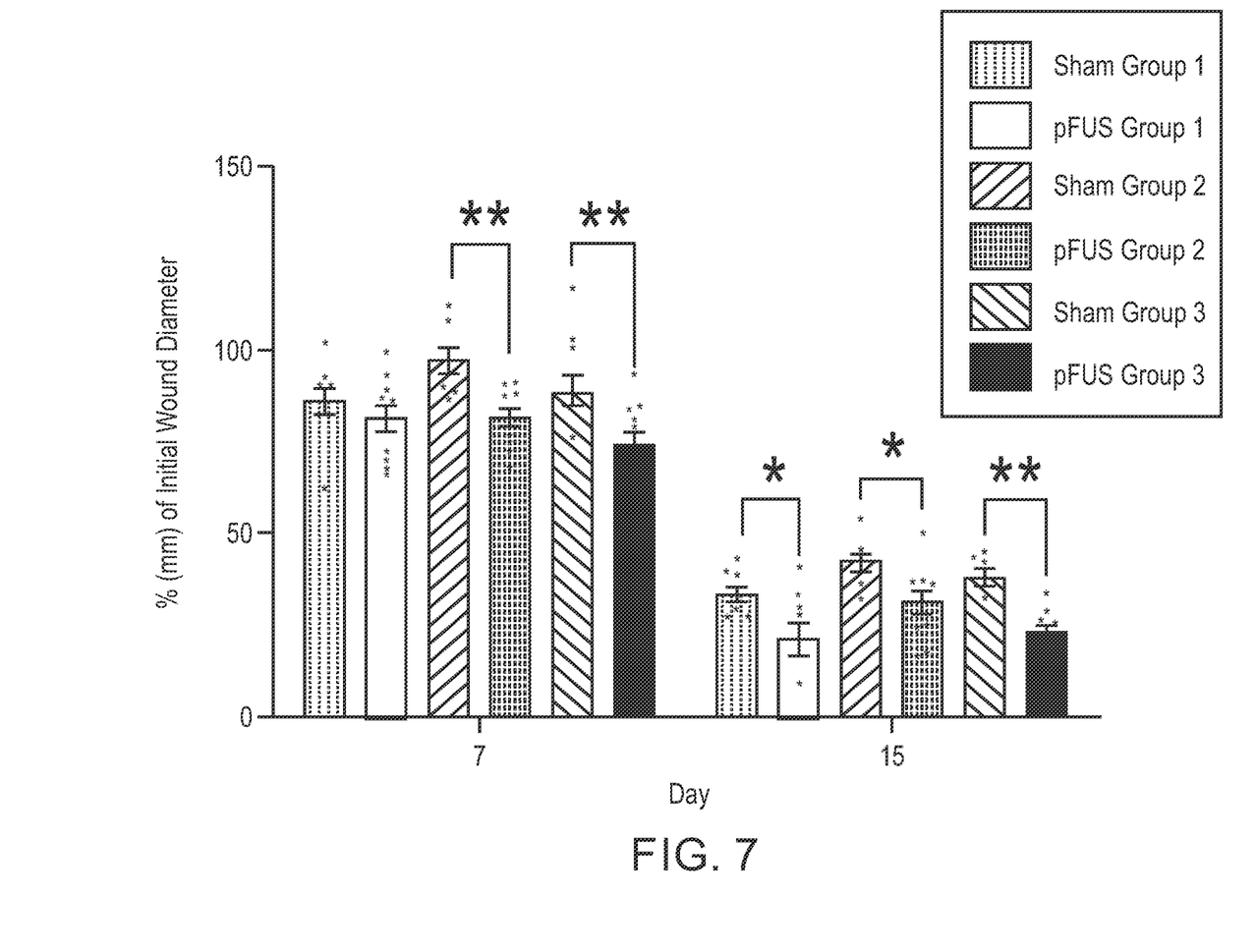
FIG. 7 graphically depicts change in wound size (% (mm) of initial wound diameter) over time and by study group, in accordance with aspects of the present disclosure.

With the timeline described above in mind, excisional wounds were created on day 0, illustrated photographically in the leftmost column of FIG. 6, which depicts representative longitudinal images of wound healing progression in ZDSD rats (scale bar=10 mm (lower right panel)). As noted above, ultrasound stimulation or sham stimulation began approximately 24 hours following the wounding procedure. Although an 8 mm biopsy punch was used to create defined wounds, there were nonetheless variations (≤1.5 mm; ≈14%) in wound diameter due to the looseness of the skin. Group 1 demonstrated a decrease in percent of initial wound diameter of 4.68±4.9% (ns) pFUS vs sham by day 7 (middle column of FIG. 6) and increased to a difference of 12.16±4.7% (p<0.05) at day 15 (rightmost column of FIG. 6). Group 2 saw a decrease of 15.9±4.1% (p<0.05) (pFUS vs sham) at day 7 and 10.97±4.2% (p<0.05) at day 15. Group 3 revealed a reduction of 14.83±6% (p<0.05) (pFUS vs sham) at day 7 and 15.12±2.2% (p<0.001) at day 15. Sham controls (33-41% of original wound size at day 15) were similar to the ZDSD from previously the published reports (≈33% of original wound size). These results are illustrated graphically in FIG. 7. With respect to FIG. 7, wound diameters were normalized to their respective day 0 diameter (E/B). Wounds were significantly smaller by day 7 in both Group 2 and Group 3 pFUS treated rats vs Sham controls (Δ15.94±4.12% (p=0.003) and Δ14.83±6.02 (p=0.024)). At day 15, all pFUS treated were significantly smaller than sham (20±4 vs 33±3; p<0.05) and week Group 3 treated were also significantly smaller than sham controls (24±2 vs. 38±2; p<0.001). N=10 wounds/cohort.

Figure 8:
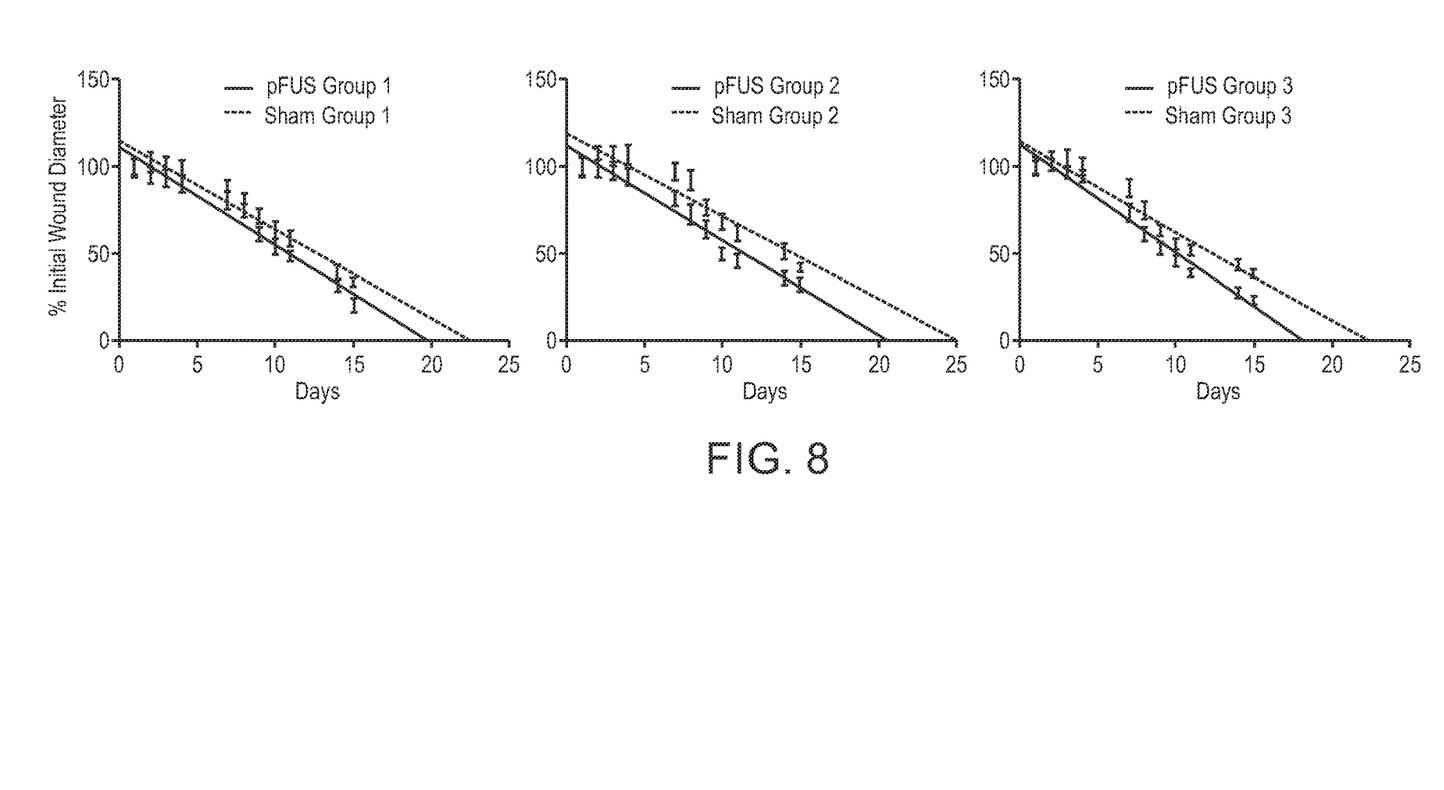
FIG. 8 depicts linear regressions for each study group relating wound closure over time, in accordance with aspects of the present disclosure.

While wounds closed in all groups over time, the rate of closure (% mm change in diameter/day), was significantly accelerated in all three pulsed focused ultrasound cohorts during the first 24 hours after the first stimulation (Table 1). In particular, a rate of % reduction in diameter/day was calculated. The data suggest that pulsed focused ultrasound influences the first 24 hours of healing to a greater extent than the remainder of the time course. This may indicate that early wound bed inflammation is altered in a way that promotes healing. The closure rates remained accelerated through day 15, although not significantly so. As many wounds were not allowed to progress to complete closure, predicted time to healing (X-intercept) was determined by linear regression of the daily wound diameter measurements, as illustrated graphically in FIG. 8. In particular, a linear regression analysis was used to predict the days to healing which was reduced with pulsed focused ultrasound stimulation in each group. The elevation and intercepts of the slope were significantly different both within each group (Group 1, p=0.0032; Group 2, p=0.0005; Group 3, p=0.0012) and between groups (p<0.001). At day 15, regression analysis suggested that wounds would be completely closed between days 17 and 23 (similar to healthy SD rats) for all pulsed focused ultrasound stimulated cohorts as determined by the 95% CI of the X-intercept (days) when Y=0 (wound size). Table 2 demonstrates the regression analysis depicted in FIG. 8. The X-intercepts for the linear regression lines are designated as days to healing, and the days faster with pulsed focused ultrasound are the difference between sham and pulsed focused ultrasound at the X-intercept. As shown, FUS stimulation resulted in healing times 2.6-4.5 days sooner.

Rows are clustered using correlation distance and average linkage. Columns are grouped first by location followed by group. Asterisk represent significant differences in relative expression (p<0.05).

Of the 34 proteins examined, spleen lysates from Group 1 had four proteins with significantly different expression levels (Agrin, 0.87±0.24 (p=0.004); Ciliary Neutrophic Factor (CNTF), −0.58±0.25 (p=0.04) and IL-1R6, −1.20±0.38 (p=0.01)); Group 2 had 11 proteins with significant differences from sham controls (Agrin, 3.10±0.78 (p=0.003); Cytokine-Induced Neutrophil Chemotractant (CINC)-2α, 1.59±0.67 (p=0.046); CINC-3, 1.64±0.68 (p=0.04); Fas Ligand, −0.85±0.28 (p=0.01); IL-1 R6, 2.32±1.03 (p=0.047); IL-13, −0.71±0.28 (p=0.03); IL-6, −2.24±0.81 (p=0.02); Leptin, −1.22±0.42 (p=0.02); Prolactin R, −2.93±1.24 (p=0.046); RAGE (Receptor for Advanced Glycation End-Products), −2.70±0.95 (p=0.02); TNFα, −0.85±0.31 (p=0.02); Vascular Endothelial Growth Factor (VEGF), −0.60±0.24 (p=0.03)); and Group 3 had 8 significantly altered protein levels (CINC-1, −1.98±0.70 (p=0.02); CINC-2α, −1.61±0.71 (p=0.049); IL-13, −1.29±0.50 (p=0.03); IL-2, −1.45±0.47 (p=0.01); IL-4, −1.53±0.62 (p=0.03); Prolactin R, 0.14±0.06 (p=0.04); RAGE, −2.95±0.31 (p=0.00001)). Wound lysates from Group 1 had five proteins with different expression levels (Agrin,

TABLE 1

| % diam. reduction/day | pFUS GRP 1 | Sham GRP 1 | P Value | pFUS GRP 2 | Sham GRP 2 | P Value | pFUS GRP 3 | Sham GRP 3 | P Value |
|---|---|---|---|---|---|---|---|---|---|
| 24 hrs after 1$^{st}$ pFUS | 4.24 (1.69) | −2.77 (2.51) | 0.0324 | 0.61 (1.66) | −6.51 (2.35) | 0.0218 | 0.47 (0.10) | −0.01 (0.01) | 0.0019 |
| 1$^{st}$ 7 days | 2.28 (0.82) | 0.36 (1.12) | 0.2116 | 1.57 (0.71) | −1.85 (1.59) | 0.0971 | 0.84 (0.45) | 0.45 (0.26) | 0.4904 |
| 2$^{nd}$ 7 days | 14.28 (5.54) | 7.90 (1.81) | 0.2984 | 10.91 (2.51) | 9.73 (2.64) | 0.7525 | 1.02 (0.32) | 1.07 (0.50) | 0.9282 |
| Total | 9.48 (3.76) | 4.89 (1.66) | 0.278 | 7.17 (2.12) | 5.10 (2.50) | 0.5342 | 0.94 (0.25) | 0.82 (0.32) | 0.7695 |

TABLE 2

| | GROUP 1 | | GROUP 2 | | GROUP 3 | |
|---|---|---|---|---|---|---|
| | pFUS Stimulated | Sham Control | pFUS Stimulated | Sham Control | pFUS Stimulated | Sham Control |
| Projected days to Healing (X-Intercept) | 19.77 | 22.36 | 20.47 | 24.97 | 18.10 | 21.89 |
| 95% CI of X-Intercept | 18.75 to 22.72 | 21.27 to 31.13 | 18.13 to 21.92 | 20.29 to 25.14 | 16.86 to 19.64 | 19.48 to 25.36 |
| R$^2$ | 0.965 | 0.96 | 0.9651 | 0.8956 | 0.9752 | 0.9403 |
| Days Faster with pFUS | 2.59 | | 4.5 | | 3.79 | |

Figure 9:
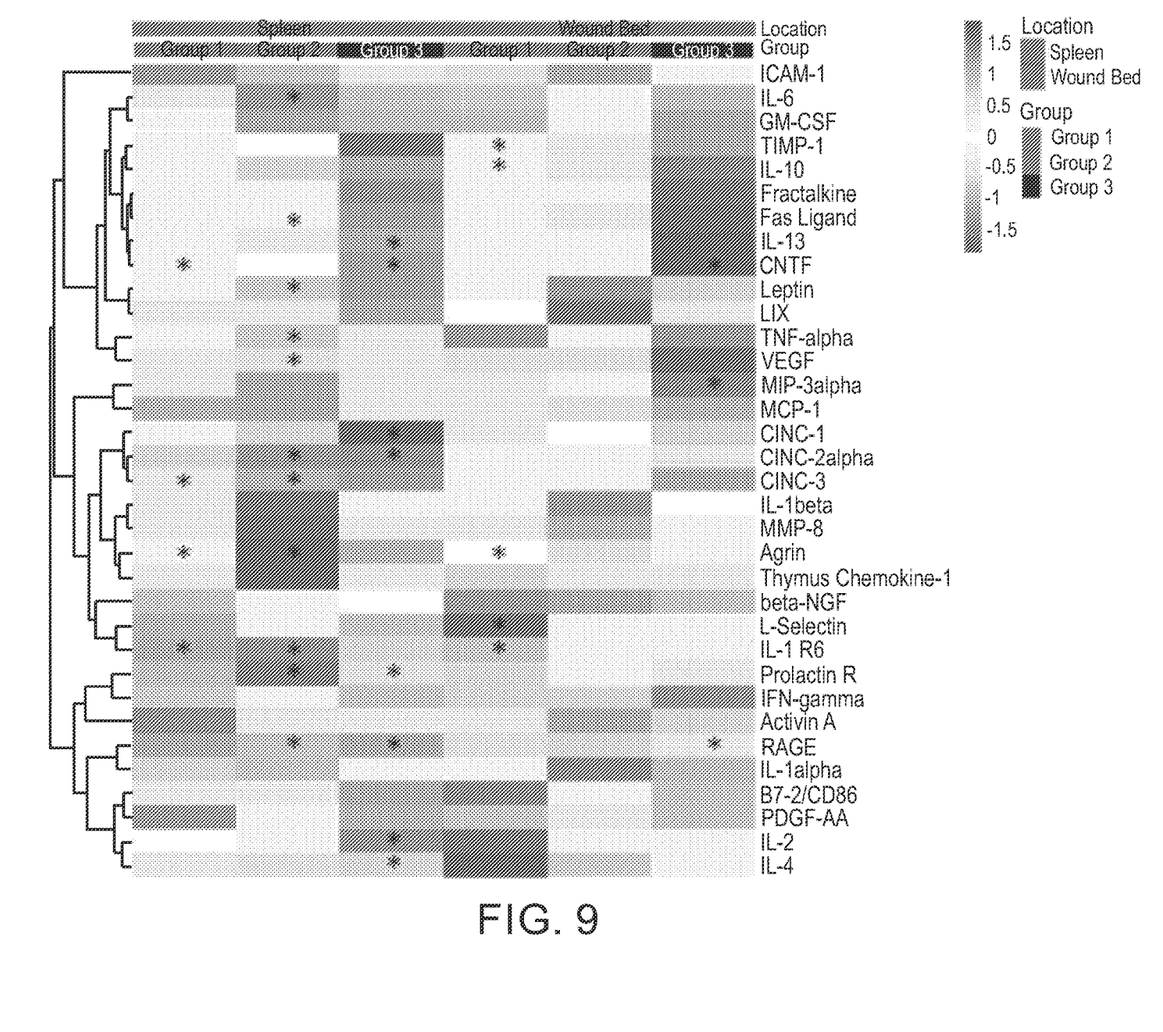
FIG. 9 depicts a heatmap illustrating relative changes in proteins for each study group and at the spleen and wound bed, in accordance with aspects of the present disclosure.

Protein expression in spleen and wound bed lysates was also examined. In particular, the connection between splenic stimulation and distal wound sites was examined by assaying both spleen and wound bed lysates against a panel of chemokines, cytokines, and growth factors. At 16 days following wounding, the relative changes in proteins were determined (log2FC) and plotted as a heatmap with hierarchal cluster analysis, as shown in FIG. 9. In particular, spleen and wound bed lysates at day 16 post wounding were assessed against a panel of cytokines, chemokines and growth factors. A heat map (FIG. 9) was generated depicting the relative change (log2 fold change of median florescence intensity) comparing pulsed focused ultrasound vs Sham controls. Hierarchical cluster analysis was performed where rows are centered; unit variance scaling is applied to rows.

0.68±0.28 (p=0.03); IL-1 R6, 1.64±0.42 (p=0.001); IL-10, −0.57±0.24 (p=0.03); L-Selectin, 2.53±0.72 (p=0.003); Tissue Inhibitor of Metalloproteinases (TIMP)-1, −0.43±0.18 (p=0.03)); Group 2 wound bed lysates were not found to have any significant differences and Group 3 had three proteins levels that were different (CNTF, 2.02±0.79 (p=0.03); Macrophage Inflammatory Protein (MIP)-3α, −1.93±0.67 (p=0.02); RAGE, −2.14±0.90 (p=0.04)). Group 1 had two proteins that had significantly altered expression in both the spleen and wound bed (Agrin, increased in both and IL-1R6, down in spleen and up in wound) and Group 3 had one (RAGE, decreased in both spleen and wound bed). The dendrogram, which includes all 3 test groups and both spleen and wound bed lysate data, revealed 3 distinct clusters of closely associated proteins consisting of the following proteins in each: Cluster 1. Intercellular Adhesion Molecule (ICAM)-1, IL-6, Granulocyte-Macrophage Colony Stimulating Factor (GM-CSF), TIMP-1, IL-10, Fractalkine, Fas Ligand, IL-13, CNTF, Leptin, Lipopolysaccharide-Induced CXC Chemokine (LIX), TNFα, and VEGF. Within this cluster the 2 proteins with the closest linkage were Fas Ligand and Fractalkine. Cluster 2. MIP-3α, Monocyte Chemoattractant Protein (MCP)-1, CINC-1, CINC-2α, CINC-3, IL-1β, Matrix Metalloproteinase (MMP)-8, Agrin, Thymus Chemokine-1, β-NGF, L-Selectin, and IL-1R6. This cluster revealed the closest linkage between the CINC proteins. Cluster 3. Prolactin R, IFN-γ, Activin A, RAGE, IL-1α, B7-2/CD86, PDFG-AA, IL-2, and IL-4. In Cluster 3, the 2 closest proteins were B7-2/CD86 and PDGF-AA.

Table 3 summarizes both the proteins associated with, and their role in, wound healing along with which main cluster they were segregated into. In particular, the analytes tested in the test panel are listed with their role in wound healing. The proteins that were significantly different in pulsed focused ultrasound treated vs sham controls at 16 days post wound creation are in bold italics. Analytes from each phase of healing were significantly altered in the tissue tested (Spleen (S); Wound bed (W); Both (B); Neither (N)) and many processes within the phases were affected as well. Superscripts indicate the cluster that the proteins were associated with in the hierarchical cluster analysis.

Figure 10:
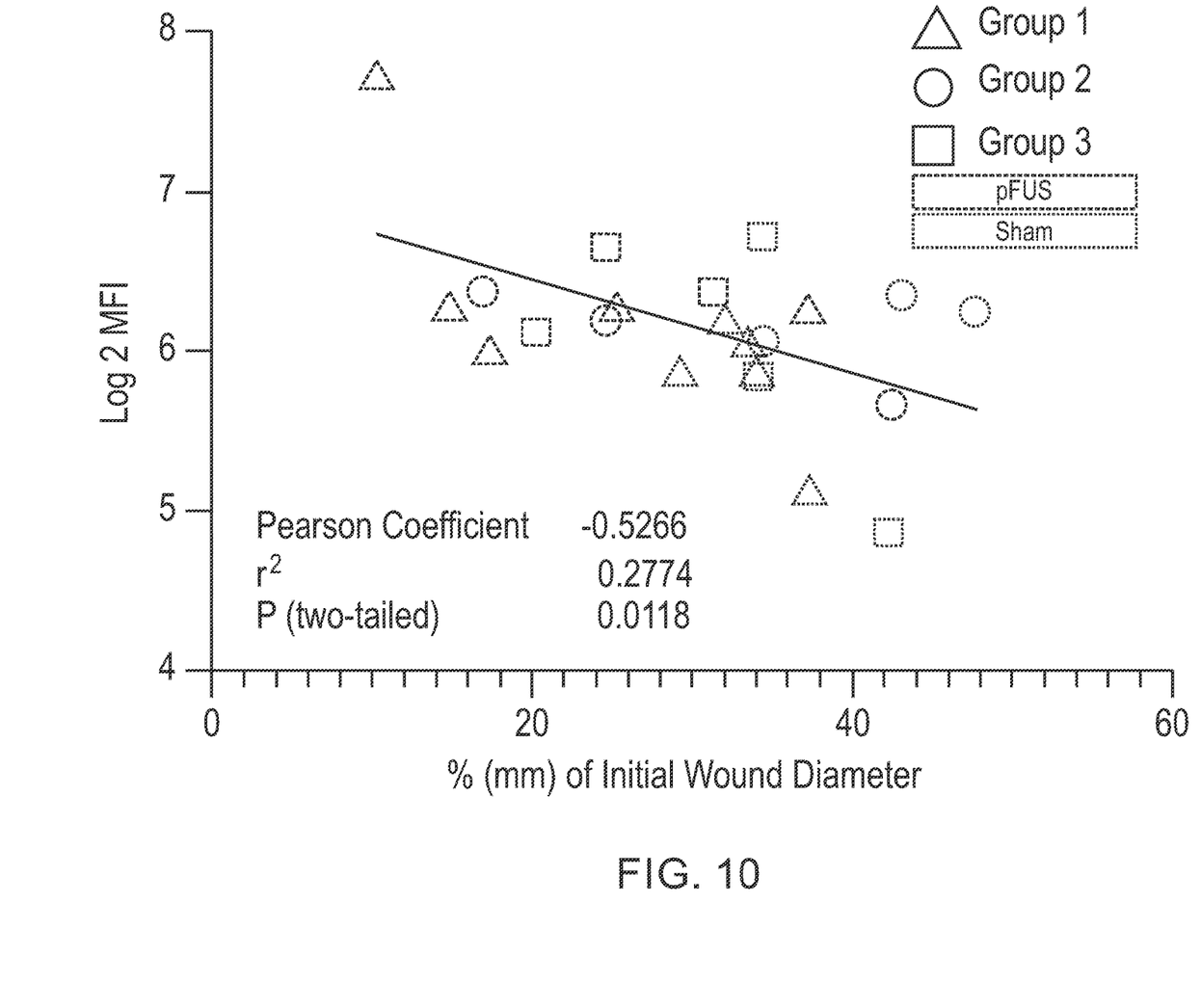
FIG. 10 graphically depicts the negative correlation between higher Agrin protein expression with smaller wounds, in accordance with aspects of the present disclosure.

Proteins measured in this study were associated with every stage and process of the wound healing cascade and many of them had significant alterations. Among the notable features illustrated in Table 3, the results describe the upregulation of remodeling and proliferative phase proteins known to be affected by M2 macrophage cells, corresponding to a change in phenotype with respect to the wound healing profile in response to the pulsed ultrasound treatments as described herein.

cally demonstrates the negative correlation (Pearson coefficient −0.5266) between higher Agrin protein expression with smaller wounds. In particular, the scatterplot demonstrates a significant correlation between Agrin protein expression in wound beds and % existing wound at day 15 post wounding. Higher Agrin expression is exhibited in smaller (more closed) wounds which associates to its role in ECM formation and remodeling. Most of the wounds that were smaller were also in the pulsed focused ultrasound stimulated groups and had likely progressed towards proliferation and remodeling in the wound healing cascade.

With the preceding in mind, these results support certain discussion points. The ZDSD rat model is a hybrid of the Zucker Diabetic Fatty (ZDF fa/fa) rat and SD. The model recapitulates the stages of Type 2 diabetes mellitus from pre-diabetes through overt diabetes to diabetic complications, and these rats have similar comorbidities as human Type 2 diabetes mellitus including nephropathy, neuropathy, fatty liver, hypertension, metabolic syndrome, cardiac dysfunction, and chronic inflammation. Non-fasting blood glucose levels are generally defined as <140 mg/dL in cases of non-disease and >200 mg/dL with diabetes and the middle ground is classified as prediabetes. Starting at week 21, non-fasting glucose levels spontaneously rise above 200 mg/dL in this animal model. With the rise above euglycemic blood glucose levels in all 3 groups, a characteristic delay in wound healing was observed that was similar to prior studies of the ZDSD model.

It was observed that wound closure rates were significantly faster in pulsed focused ultrasound treated animals during the 24 hours following the first pulsed focused ultrasound treatment (day 2 of the study). This corresponds to the time in the healthy healing cascade when the classical macrophage (M1) population is at its peak and neutrophils are post peak. Pulsed focused ultrasound may facilitate the

TABLE 3

| Phase | Process | Wound Resolution Involved Proteins |
|---|---|---|
| Inflammatory | Inflammation | *CINC-1* (S)$^2$, *CINC-2α* (S)$^2$, *CINC-3* (S)$^2$, *Fas Ligand* (S)$^1$, Fractalkine (N)$^1$, *IL-2* (S)$^3$, IFNγ (N)$^3$, IL-1α (N)$^3$, IL-1β (N)$^2$, *IL-6* (S)$^1$, *IL-10* (W)$^1$, MCP-1 (N)$^2$, PDGF (N)$^3$, *RAGE* (B)$^3$, *TNF-α* (S)$^1$ |
|  | Cell Migration | ICAM-1 (N)$^1$, LIX (N)$^1$, *L-Selectin* (W)$^2$, *MIP-3α* (W)$^2$, β-NGF (N)$^2$, thymus chemokine-1 (N)$^2$ |
|  | Cell Differentiation | B7-2/CD68 (N)$^3$, *IL-10* (W)$^1$ |
|  | Immune Response | Activin-A (N)$^3$, *IL-10* (W)$^1$, *IL-13* (W)$^1$, MCP-1 (N)$^2$, PDGF (N)$^3$, *TNF-α* (S)$^1$ |
| Proliferative | Proliferation | *CNTF* (B)$^1$, IL-1α (N)$^3$, *IL-10* (W)$^1$, *IL-2* (S)$^3$, IFNγ (N)$^3$, *Leptin* (S)$^1$, β-NGF (N)$^2$, PDGF (N)$^3$, GM-CSF (N)$^1$, *TNF-α* (S)$^1$ |
|  | Reepithelization | Activin-A (N)$^3$, IL-1α (N)$^3$, *IL-6* (S)$^1$, PDGF (N)$^3$, *Prolactin R* (S)$^3$ |
|  | Angiogenesis | Activin-A (N)$^3$, Agrin (B)$^2$, IL-1 (N)$^2$, *IL-6* (S)$^1$, *VEGF* (S)$^1$ |
|  | ECM Tissue Formation | *Agrin* (B)$^2$, *IL-4* (S)$^3$, PDGF (N) |
| Remodeling | ECM Remodeling | *Agrin* (B)$^2$, IL-1α (N)$^3$, *IL-1 R6* (W)$^2$, *IL-6* (W)$^1$, MMPs (N)$^2$, *TIMPs* (W)$^1$, PDGF (N)$^3$ |
|  | Wound Contraction | *CINC-1* (S)$^2$, *CINC-2α* (S)$^2$, *CINC-3* (S)$^2$, *IL-10* (W)$^1$, β-NGF (N)$^2$ |
|  | Scarring | *TIMP-1* (W)$^1$ |

One observation is that Agrin, which is associated with angiogenesis, ECM formation, and ECM remodeling and which is more highly expressed in fibroblasts, monocytes and T-cells, was correlated, moderately, with wound diameter. In particular, Agrin was identified as having a significant ($P<0.05$) correlation with wound size. FIG. 10 graphiprogression through the inflammation phase of healing via systemic cytokine level alteration. Measurements of splenic and whole blood levels of TNFα and splenic levels of IL-1α have demonstrated that splenic pulsed focused ultrasound modulates the systemic signaling of CAP and NF-KB in a rat model of endotoxemia. In addition, that modulation can be connected between a locally stimulated lymph node and the spleen via a long-range nerve pathway and pulsed focused ultrasound modulation of CAP attenuates the immune response in a mouse model of pneumonia. Lack of progression from a proinflammatory to an anti-inflammatory phenotype is one of the major drivers of delayed wound healing. The presently described techniques and associated data suggest that spleen-targeted pulsed focused ultrasound stimulation accelerates wound closure in ZDSD rats, rendering the wound-healing response as similar to healthy rats. It is also suggested that, via altered healing rates, the systemic immune response is altered with stimulation, driving the response from proinflammatory to anti-inflammatory (M1 to M2 phenotypes) more quickly than observed in sham controls. This may be explained by a continuous replenishment of wound macrophages from activated circulating monocytes. Furthermore, the total blood volume of a 500 g rat (average starting weight in this study) is approximately 31 ml, the blood volume of the spleen is around 5% of the total volume, or 1.5 ml and the blood flow rate to the spleen is 0.63 ml/min. During the 3 minutes of ultrasound stimulation 1.9 ml of the blood volume has circulated through the spleen in addition to the resident volume, resulting in about 11% of the blood volume exposed to neurotransmitter and signaling molecules released in the spleen as a result of ultrasound energy, and could account for differences in immune cell activation and cytokine expression.

Splenic contracture due to injury coincides with the timing of the first ultrasound dose described herein and results in a release of stored immune cells into circulation. These stored cells have been shown to relocate to the sites of injury through tracking studies. It has also been demonstrated that blocking the acetylcholine receptor 7a on monocytes (a binding site of acetylcholine, released during CAP activation), attenuates CAP activation and TNFα expression remains high after LPS challenge. Together, these findings, along with the differential cytokine expression that was observed in the presently described study, give an indication as to how splenic stimulation with ultrasound may have a systemic effect on peripheral organs (skin) via activation of CAP. Reservoir monocytes may be activated via acetylcholine binding to 7α receptors upon splenic pulsed focused ultrasound (lowering TNFα and other pro-inflammatory cytokines). As the wound heals, and the spleen is stimulated daily, there may be an increased net infiltration of monocytes to the wound bed versus non-stimulated sham controls. Pulsed focused ultrasound treatment may also allow these cells to be recruited more effectively from the splenic reservoir monocytes after they are released into circulation.

Cytokines, chemokines, and growth factors are central factors in orchestrating the wound healing response, and as discussed herein several are modulated by splenic pulsed focused ultrasound treatment. Specifically, high expression of RAGE is linked to inflammation, hyperglycemia, Alzheimer's disease, cancer, and aging. When blocked or down regulated, inflammatory cell influx, NF-κB signaling, and cytokine production are suppressed. RAGE, significantly lower in Groups 2 and 3 spleen and Group 3 wound beds, is involved with the inflammation phase of healing and is highly expressed in T and B lymphocytes as well as macrophage. L-selectin, expressed on leukocytes and responsible for mediating capturing and tethering to the vascular endothelium to traffic lymphocytes and neutrophils to inflammatory sites, was significantly higher in the wound beds of Group 1. Ciliary neurotrophic factor (CNTF) has been shown to protect against LPS induced endotoxemia and reduce TNFα production and may also increase M2 macrophage differentiation. The cytokines that were altered in the spleen after 2 weeks of ultrasound stimulation included IL-6, IL-13, CNTF, TNFα, CINC-1, CINC-2α, CINC-3, IL-1R6, and RAGE and are all expressed in the spleen as well as secreted into blood via leukocytes. Because these proteins are secreted, they are likely to effect systemic response to injury. IL-1R6 is expressed in predominately in skin but is also expressed in CD4$^+$ T-cells and monocytes, but not neutrophils. Il-1R6 activation induces NF-kB and MAPK signaling, both which are essential for healing progression. Surprisingly, IL-10, a potent anti-inflammatory cytokine, was lower in both spleen and wound bed lysates in some groups. A possible reason is that by day 16 the wounds have progressed past the inflammatory phase, where IL-10 is most prevalent. Both Agrin and IL-1 R6, involved with ECM remodeling, were increased with pulsed focused ultrasound vs sham controls, while TIMP-1, implicated in scarring/fibrosis was decreased. Differences in expression of any particular cytokine, between groups, could be due to different wound healing progression as it relates to the severity of Type 2 diabetes mellitus modeled with each group. Taken together, cytokines, chemokines and growth factors are responsible for many processes in the wound healing cascade and aberrant expression disrupts the progression through the healing cascade. Pulsed focused ultrasound stimulation of splenic CAP alters proteins associated with each phase of wound healing, as well as many processes within the phases. These alterations include lower expression of some proinflammatory proteins as well as increased expression of some anti-inflammatory proteins.

With the preceding discussion and explanation in mind, it may be appreciated that technical advantages of the presently disclosed techniques include, but are not limited to the use of applied energy, such as ultrasound in general and pulsed focused ultrasound (pFUS) in particular, to facilitate wound healing, including the healing of chronic wounds. In certain such embodiments wound healing times may be shortened or wound that are not healing (e.g., persistent wounds) may heal in response to such applied energy applications. A device or system may be employed to apply such focused ultrasound treatments and that comprises, among other components, a function generator configured to produce pulsed sinusoidal waveforms, a power amplifier (e.g., an RF power amplifier), a matching network, and a transducer (e.g., a high intensity focused ultrasound (HIFU) transducer). Energy (e.g., focused ultrasound pulses) may be applied to the spleen or other internal organs, features, or structures capable of modulating inflammation via cholinergic anti-inflammatory pathway (CAP) signaling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of promoting cutaneous wound healing, comprising:
   positioning an ultrasound transducer at a stimulation site on a subject having a cutaneous wound;

non-invasively applying pulsed focused ultrasound (pFUS) using the transducer to cause modulation of a target anatomic site that is on or within an internal organ, wherein the target anatomic site contains or regulates resident or circulating immune cells; and wherein modulation of the target anatomic site of the subject causes migration of one or more of monocytes, macrophages, or neutrophils to a wound bed of the cutaneous wound.

2. The method of claim 1, wherein the stimulation site is distal from the wound.

3. The method of claim 1, wherein the target anatomic site is a spleen of the subject and wherein the non-invasively applied pulsed focused ultrasound stimulates nerve pathways within the spleen.

4. The method of claim 1, wherein modulation of the target anatomic site alters concentrations of systemic circulating pro-inflammatory molecules.

5. The method of claim 4, wherein the pro-inflammatory molecules comprise TNFα and IL-6.

6. The method of claim 1, wherein applying pulsed focused ultrasound to the target anatomic site of the subject comprises applying pulsed focused ultrasound to the spleen of the subject at least once a day over a treatment interval.

7. The method of claim 1, wherein the pulsed focused ultrasound (pFUS) applied to the target anatomic site has parameters of a pulse center frequency of 1.1 MHz, a pulse repetition period of 0.5 msec, a 150 cycle burst, a burst period of 200 msec, and an aggregate duration of 3 or more minutes.

8. The method of claim 1, wherein applying pulsed focused ultrasound (pFUS) to the spleen of the subject accelerates wound closure by 3 to 5 days relative to no treatment.

9. The method of claim 1, wherein the target anatomic site is the spleen and wherein IL-6 levels are reduced in the spleen in response to applying the pulsed focused ultrasound (pFUS) to the spleen.

10. The method of claim 1, wherein L-selectin levels are higher in the wound bed of the wound in response to applying the pulsed focused ultrasound (pFUS) to the target anatomic site.

11. The method of claim 1, wherein one or both of anti-inflammatory cytokines or proteins associated with wound healing increase in one or both of the spleen of the subject or the wound bed.

12. The method of claim 1, wherein modulation of the target anatomic site of the subject modulates invasiveness of one or more types of circulating immune cells.

13. The method of claim 1, wherein a first pulsed focused ultrasound (pFUS) is applied to the target anatomic site of the subject within 24 hours of the wound forming.

14. A system for promoting cutaneous wound healing, comprising:

a function generator configured to produce a pulsed sinusoidal waveform;

an RF power amplifier configured to amplify the pulsed sinusoidal waveform;

a matching network configured to receive the amplified pulsed sinusoidal waveform; and a transducer connected to the matching network and configured to generate focused ultrasound pulses based upon the amplified pulsed sinusoidal waveform;

wherein the system is configured to, upon placement of the transducer at an external stimulation site of a subject, direct focused ultrasound pulses toward a target anatomic site that is on or within an internal organ, wherein the target anatomic site contains or regulates resident or circulating immune cells; and wherein modulation of the target anatomic site of the subject causes migration of one or more of monocytes, macrophages, or neutrophils to a wound bed of a cutaneous wound.

15. The system of claim 14, wherein the focused ultrasound pulses have a pulse center frequency of 1.1 MHZ, a pulse repetition period of 0.5 msec, a 150 cycle burst, a burst period of 200 msec, and an aggregate duration of 3 or more minutes.

16. The system of claim 14, wherein the target anatomic site is a spleen of the subject and wherein non-invasively applied pulsed focused ultrasound stimulates nerve pathways within the spleen.

17. The system of claim 14, wherein modulation of the target anatomic site alters concentrations of systemic circulating pro-inflammatory molecules.

18. The system of claim 14, wherein one or both of anti-inflammatory cytokines or proteins associated with wound healing increase in one or both of the spleen or wound bed.

19. The system of claim 14, wherein modulation of the target anatomic site of the subject modulates invasiveness of one or more types of circulating immune cells.

20. A method of promoting cutaneous wound healing, comprising:

positioning an ultrasound transducer at a stimulation site on a subject having a cutaneous wound;

non-invasively applying pulsed focused ultrasound (pFUS) using the transducer to cause modulation of a target anatomic site that is on or within an internal organ, wherein the target anatomic site contains or regulates resident or circulating immune cells; and wherein modulation of neurons within the target anatomic site causes a phenotype change of one or more of leukocytes, monocytes, macrophages, or neutrophils that alter healing of a distal wound bed of the cutaneous wound.

* * * * *